United States Patent
Asawa et al.

(10) Patent No.: US 6,185,346 B1
(45) Date of Patent: Feb. 6, 2001

(54) PROPAGATION IN LOWEST ORDER MODES OF MULTIMODE GRADED INDEX FIBER, RESULTING IN: VERY LOW TRANSMISSION LOSS, LOW MODAL NOISE, HIGH DATA SECURITY, AND HIGH DATA RATE CAPABILITIES

(76) Inventors: Charles K. Asawa; Jane K. Asawa; Mike H. Asawa, all of 16766 Bollinger Dr., Pacific Palisades, CA (US) 90272-3218

( * ) Notice: Under 35 U.S.C. 154(b), the term of this patent shall be extended for 0 days.

(21) Appl. No.: 09/205,436

(22) Filed: Dec. 4, 1998

(51) Int. Cl.$^7$ .................................................. G02B 6/26
(52) U.S. Cl. ............................................................ 385/28
(58) Field of Search ................................ 385/28, 32, 24, 385/45

(56) References Cited

U.S. PATENT DOCUMENTS

| | | | |
|---|---|---|---|
| 4,804,248 | 2/1989 | Bhagavatula | 385/28 |
| 4,815,805 | 3/1989 | Levinson et al. | 385/48 |
| 4,974,931 | 12/1990 | Podle | 385/28 |
| 5,077,815 | 12/1991 | Yoshizawa et al. | 385/28 |
| 5,138,675 | 8/1992 | Schofield | 385/28 |
| 5,337,380 | 8/1994 | Darbon et al. | 385/28 |
| 5,416,862 | 5/1995 | Haas et al. | 385/28 |
| 5,490,227 | * 2/1996 | Tanabe et al. | 285/28 |
| 5,712,937 | 1/1998 | Asawa et al. | 385/49 |
| 6,044,188 | * 3/2000 | Kropp | 385/28 |

* cited by examiner

Primary Examiner—Hung N. Ngo

(57) ABSTRACT

This invention relates to optical fiber communication systems where data light is launched into a very small set of the lowest order propagation modes of multimode graded-index fibers, resulting in very high data rate transmission capability. We have determined, experimentally and theoretically, that light launched into a small set of a few lowest order propagation modes, or launched only into the fundamental propagation mode of multimode graded-index fiber, converts into and within a limited small set of lowest order modes due to severe bending perturbations that may occur in deployed multimode graded-index fiber transmission cable. Low modal time dispersion of the limited small set of lowest order modes is much less than when all modes of the multimode graded-index fiber are launched, yielding a much higher data rate transmission capability. Added advantages are: low transmission loss, low modal noise, and data security. Methods for launching the small set of lowest order propagation modes or the fundamental propagation modes into a single multimode graded-index fiber or into a plurality of multimode fibers in other optical fiber communication networks are described.

13 Claims, 4 Drawing Sheets

LOWEST ORDER MODE
POINT-TO-POINT LINK

LOWEST ORDER MODE
POINT-TO-POINT LINK

LOWEST ORDER MODE NETWORK
WITH TWO INPUTS & FOUR OUTPUTS

PROPAGATION IN LOWEST ORDER MODES OF MULTIMODE GRADED INDEX FIBER, RESULTING IN: VERY LOW TRANSMISSION LOSS, LOW MODAL NOISE, HIGH DATA SECURITY, AND HIGH DATA RATE CAPABILITIES

BACKGROUND OF THE INVENTION

1. Field of Invention

This invention relates to optical fiber communication systems where data light is launched into the fundamental mode or into a very small set of the lowest order propagation modes of multimode graded-index fibers, resulting in very low transmission loss, low modal noise, high data security, and high data rate transmission capabilities. We have determined experimentally, as well as theoretically, that light launched into the fundamental mode or into a small set of lowest order modes of multimode graded-index fiber remains in a limited small set of lowest order modes despite severe bending perturbations of the fiber, which may occur in deployed multimode graded-index fiber transmission cable. Methods for launching the fundamental mode, or only a small set of lowest order modes in a cabled fiber, are described.

Propagation of modes within a limited small set of the lowest order propagation modes results in much less modal time dispersion, or pulse spreading, than when all modes of the multimode graded-index fiber are launched, thus permitting transmission at much higher data rates. In addition, since the lowest order modes remain in the limited small set of lowest order modes, instead of converting into radiation modes when the fiber is perturbed, data transmission attenuation is exceptionally small. Further, since the propagation modes are the lowest order modes and constrained to the center of the core, modal noise is low. Also, since data in the lowest order modes are not readily converted into radiation modes, despite severe perturbation of the fiber, high data security results.

2. Purpose

Local networks commonly use multimode graded-index fiber, which satisfies low data rate transmission requirements. Light is launched into most of the propagation modes by the light source, such as light emitting diodes. A benefit is that the large fiber core and large numerical aperture of multimode fiber allows more of the source light emission to be launched into the fiber. Another benefit is lower costs for lower bandwidth optoelectronic transceivers and peripherals. Many installed local networks currently use only multimode fibers.

In normal transmission where all modes of the multimode graded-index fiber are propagated, maximum data rate times cable length transmission capability quoted by fiber cable manufacturers is about 500 million bits per second times kilometers of fiber, or 500 Mbps-Km. The manufacturers' quoted numbers are satisfactory for many local area uses. However, much higher data rates are extremely important for future optical fiber communication networks. High data rates of many billion bits per second, or Gbps, over longer distances will be needed to transmit a manifold of new uses predicted for the future. This invention addresses that need using multimode graded-index fiber cables.

When higher data rates are required, this invention allows multimode graded index fibers in existing cables or in new cables to be used to transmit data at higher rates. Transmitting the data in a small set of the lowest order transmission modes of the multimode graded-index fiber results in high data rate capability, since modal time dispersion of pulses is reduced due the smaller number of modes, allowing shorter pulses to be transmitted. This Specification discloses how to launch the set of lowest order modes and how to use this transmission method in a variety of optical fiber communication networks.

Other significant benefits of launching only the lowest order modes, or just the fundamental order mode, into multimode graded-index fiber are that low transmission losses are incurred, modal noise is minimized, and data transmission is exceptionally secure.

3. Prior Art

Multimode graded-index fibers for communication uses were studied in the 1970's both theoretically and experimentally. Published papers on pulse broadening in multimode graded-index fiber was studied by R. Olshansky and S. M. Oaks, described in the Proc. of 4th European Conf. on Optical Communications, Geneva, p. 128, 1978, and by R. Olshansky and D. B. Keck, described in Applied Optics, vol. 15, pp. 483–491, 1975. A summary of dispersion in multimode graded-index fiber is given in a book by D. Marcuse, *Principal of Optical Fiber Measurements*, pp. 255–312, Academic Press, N.Y., 1981, and a brief summary by J. M. Senior, *Optical Fiber Communications, Second Edition*, pp. 102–135, Prentice Hall, NY, 1992.

There are over a hundred different transmission modes of both polarization in a multimode graded-index communication fiber. The precise number depends upon the radius of the fiber core, the wavelength of light used, the refractive indices of the core and cladding, and the refractive index profile of the core.

Each mode of the multimode fiber propagates through the fiber at its own characteristic group velocity. A short pulse launched into all transmission modes of the fiber at its entrance end will be spread out in time at the exit end of the fiber. The detector at the fiber exit will detect a longer pulse in time than that of the original short pulse at the entrance. The longer pulse is the cumulative sum of pulses for each mode spread in time at the exit and is defined to be due to intermodal dispersion. The spread limits the maximum bit rate transmission, or bandwidth, capability of the fiber. The limitation is also dependent on the length of fiber since the pulse spread increases with fiber length. The intermodal dispersion limitation is therefore given in terms of maximum data rate times distance. The root-mean-square pulse spread also depends upon the relative power launched into each of the modes.

A near parabolic refractive index profile for the core of the multimode graded-index fiber was found to give the largest possible data rate times distance product, by minimizing the cumulative spread of the data pulse as it propagates in all the modes. Theoretically, for a near parabolic refractive index profile, about 20 Gbps-Km should be attained, but for a number of practical reasons this capability is not attained.

Prior Patent Citations

We cite the following patents for reference. However, these do not anticipate our invention:

A. U.S. Pat. No. 5,138,675, Aug. 11, 1992, by B. A. Schofield, "Mode Scrambler as an Optical Isolator for Higher-Coherence Laser in Multi-Mode Fiber Plants". Schofield's patent Specification and claims refer to a laser to multimode fiber communication system where a mode scrambler is used at the beginning of the optical circuit in order to limit the backscattered light feedback to the laser.

B. U.S. Pat. No. 4,804,248, Feb. 14, 1989 by V. A. Bhagavantula, entitled "Data Rate Limiter for Optical Transmission System". Bhagavatula's patent uses a singlemode transmission fiber. At the receiver a short multimode fiber bandwidth limiter is constructed by various alternatives in order to limit the number of modes propagated to the detector, thereby limiting the bandwidth of the link. Multimode fiber is not used as the transmission medium.

C. U.S. Pat. No. 5,077,815, Dec. 31, 1991 by S. Yoshizawa et al, entitled "Apparatus for Optically Connecting a Single-Mode Optical fiber to a Multi-Mode Optical Fiber". This patent involves launching light from a laser into a pigtailed singlemode fiber which is then coupled to a multimode fiber at an angle and with an axial displacement, in order to launch high order modes into the multimode fiber. A limited number of high order modes of the multimode fiber is launched, thereby decreasing the time modal dispersion and increasing the bandwidth capability. of the multimode fiber.

D. U.S. Pat. No. 5,416,862, May 16, 1995 by Z. Haas and M. A. Santura entitled "Lightwave Transmission System Using Selected Optical Modes". This patent is similar to the Yoshizawa patent. A mode coupler couples a singlemode fiber at an angle with the multimode fiber in order to launch high order modes.

E. U.S. Pat. No. 5,337,380, Aug. 9, 1994, by P. Darbon and E. Grard, entitled "Method of Limiting Coupling Losses between Monomode Optical Fibers Using a Piece of Multimode Optical Fiber". This patent describes a method for connecting a multimode fiber to a second monomode fiber by "welding" the two fibers in a special way and using "adiabatic cone" fabricated to couple the light from the multimode fiber to the monomode fiber.

G. U.S. Pat. No. 4,815,805, Mar. 28, 1989, by F. H. Levinson et al, entitled "Dynamic Range Reduction Using Mode Filter". The object of this patent is to provide a method and apparatus for reducing the dynamic range of an optical receiver when utilized in a distribution optical fiber system.

H. U.S. Pat. No. 4,974,931, Dec. 4, 1990, by C. D. Poole, entitled "Wavelength Selective Mode Couplers". This patent involves a circularly symmetric perturbation mode coupler of a two mode fiber, where Input light in one of the modes is coupled to the second mode. Wavelength selective filtering is claimed.

I. U.S. Pat. No. 5,712,937, Jan. 27, 1998, C. K. Asawa, et al, entitled "Optical Waveguide Including Singlemode Waveguide Channels Coupled to a Multimode Fiber". This patent involves a planar singlemode channel waveguide launcher for launching light from a plurality of light sources into multimode fiber, launching light into high order modes in order to perform an intrusion monitor function. The claims of the applicants' present application do not infringe the applicants' claims of the above patent. This present application is within the statutory period with respect to our other statements of the specification.

SUMMARY: OBJECTS AND ADVANTAGES OF OUR INVENTION (1) The main point of our invention is that light is launched into and propagated in the fundamental mode, or in a small set of the lowest order modes, instead of in the 100 or more modes, of the multimode graded-index communication fiber. Therefore, light propagating in the fundamental mode, or in a small set of lowest order modes, means that higher data rates may be transmitted, since the limited number of modes result in smaller total modal time dispersion, or pulse spread.

(2) If the multimode graded-index fiber is bent or perturbed in small microbends or large macrobends within the deployed cable, due to the buffering materials, strength members, tubing of the cable, and deployment of the cable, these perturbations can cause mode conversion. Our experiments and theoretical study has shown that light propagating in the fundamental mode, or a set of lowest order modes, are converted only into light propagating in modes contained within a limited small set of the lowest order modes of the fiber. Again, propagating light within the latter set of modes results in small time dispersion, or small pulse spreading at the end of the fiber, and, therefore, high data rate transmission is made possible. This is a significant advantage of our invention in a deployed system.

(3) Light is readily launched into the fundamental mode or into a set of the lowest order modes of multimode graded-index fiber. A singlemode fiber or a singlemode channel planar waveguide transmitting light from one or more laser diodes or light emitting diodes can be coupled into a multimode graded-index fiber in order to launch the light into the fundamental mode or into a small set of lowest order modes. The axis of the singlemode fiber or the axis of the singlemode channel is aligned coaxially with the axis of the multimode graded-index transmission fiber. The launching methods are described further in the embodiments section. Also, instead of using a singlemode fiber or waveguide channel to launch light, multimode fiber or channel having only a few transmission modes can also used to launch the set of lowest order modes in multimode graded-index fiber.

(4) Since lowest order propagating modes convert only into modes within a limited small set of lowest order modes when severe bending perturbation is applied, and do not convert into radiation modes, transmission attenuation will be much less than when all modes are propagated, where the high order modes are easily converted into radiation modes.

(5) An additional advantage is that data light propagating in the fundamental mode, or in a small set of the lowest order modes, of multimode graded-index fiber is secure and is not readily tappable by bending perturbations of the fiber since modes within said set are not converted into radiation modes.

(6) A further advantage is that modal noise is negligible. Modal noise arise when bound high order modes, having radial extension to the core boundary, are converted in a random manner into radiation modes due to misalignment or imperfections of connectors and splices, or due to imperfections at the fiber core boundary. The transmitted light then fluctuates and is noisy. With our system the propagating modes are within a limited small set of lowest order modes, where the modes are centered around the core axis and extend only a fraction of the core radius. Therefore, the lowest order modes are not affected by misalignment at the core boundary or by core surface imperfections, so that the transmitted light is free of modal noise fluctuations.

Further objects and advantages of our invention will become apparent from a consideration of the drawings and ensuing description.

DESCRIPTION OF THE PREFERRED EMBODIMENTS

This section describes how to launch the fundamental mode or a small set of the lowest order modes into a multimode graded-index fiber, using singlemode waveguide propagating light from a source. Basis for the high data rate transmission capability with data light propagating in a small set of the lowest order modes are then described. Fiber optic communication networks and distribution systems are then described, where light propagates in the fundamental mode or in a small set of the lowest order propagation modes of multimode graded index fiber.

Figure 1A:
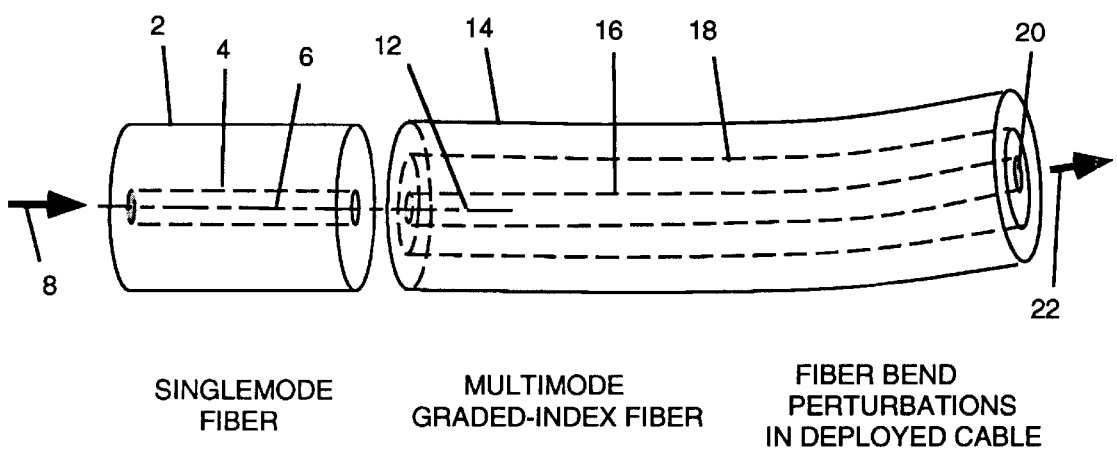
FIG. 1A describes how to launch light propagating in a singlemode fiber into the fundamental mode, or into a small set of lowest order modes, of a multimode graded-index fiber. The axis of the singlemode fiber is aligned coaxially with the axis of the multimode graded-index fiber and the two fibers are placed in contact. The figure also illustrates fiber bending due to fiber cable components, such as tight buffers, strength members, tubing, etc., and due to environmental effects such as temperature variations, mechanical vibrations, cable attachments, etc. The effect of fiber bending was discussed in (2) of the previous section.
Figure 1B:
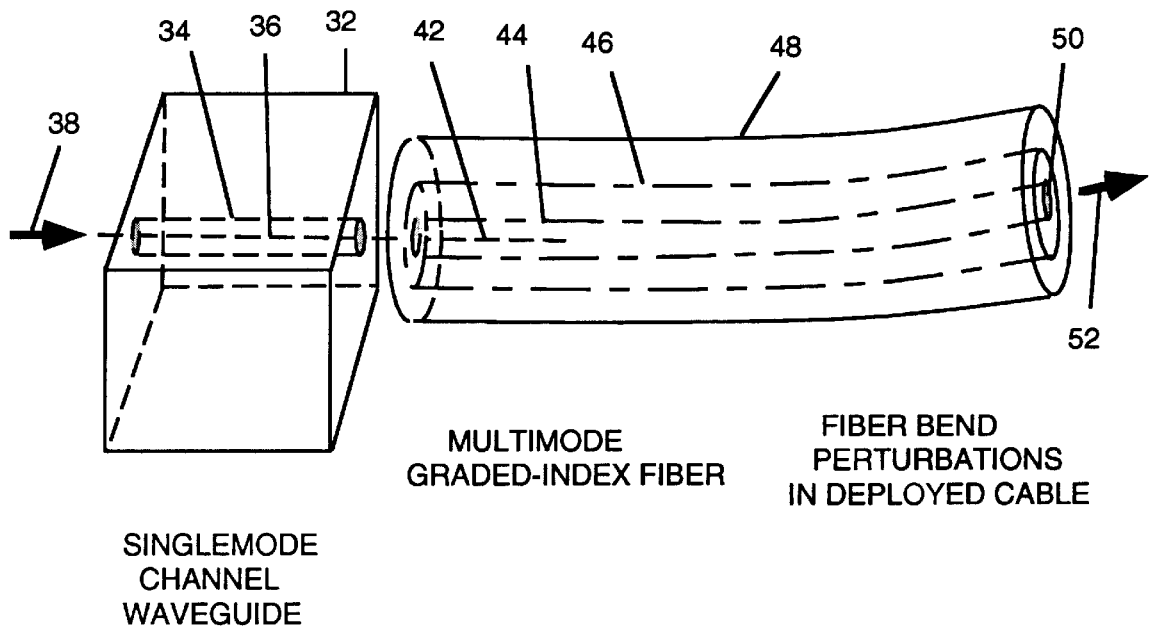
FIG. 1B similarly describes how to launch light propagating in a singlemode channel waveguide into the fundamental mode or low order modes into multimode graded-index fiber. The multimode fiber is aligned to the waveguide channel as described for FIG. 1A.

FIGS. 1A and 1B illustrate the launch method. In FIG. 1A light 8 from a light source is propagated in the core 4 of singlemode fiber 2. Multimode graded-index fiber 14 with a core 18 is aligned to the said singlemode fiber 2, where the centerline 6 of core 4 is coaxially aligned with the centerline 12 of core 18 of the multimode fiber 14. The singlemode fiber 2 and multimode fiber 14 are aligned in contact. The alignment may be performed with precision optical fiber connectors, with optical fiber mechanical splices, or by fusion splicing together fibers 2 and 14. The light is launched into the fundamental mode, or into a small set of lowest order modes, of multimode graded-index fiber 14. The spatial extent of the fundamental mode, or of the lowest order modes, is indicated by the cylinder 16, although the actual radial extent depends upon the mode or modes. The fiber bend along the cable length is indicated in the figure. A microbend or macrobend can convert the launched mode or modes into modes of a limited small set of modes, the conversion being dependent upon the radius of bend and the length of bend. The output modal pattern 20 can be determined with near-field diagnostics, where the end of the fiber is focussed to the detector face of an infrared camera and the light 22 from the fiber is examined. Our experimental study has indicated that the converted mode remain within a very small set of lowest order propagation modes of the fiber despite severe bending of the fiber.

When the transmission modes are limited to the lowest order modes, the delay time spread is considerably reduced, regardless of the deviation from optimum radial power exponent. Therefore, even when the wavelength of the source is different from that used in designing the optimum radial power exponent, or when the fiber fabrication varies from design, our invention will allow much higher bandwidth-distance capability than quoted.

FIG. 1B illustrates the launch method where singlemode channel waveguide 32 propagates the light 38 from the light source. The singlemode channel 34 transports the light. The light is launched the into the fundamental mode or into the lowest order propagation modes, indicated by the cylinder 44 of the core 46 of multimode graded-index fiber 48. The centerline 36 of singlemode channel 34 is aligned coaxially with the centerline 42 of core 46. The interfaces are aligned in contact and can be affixed with adhesive.

Figure 2:
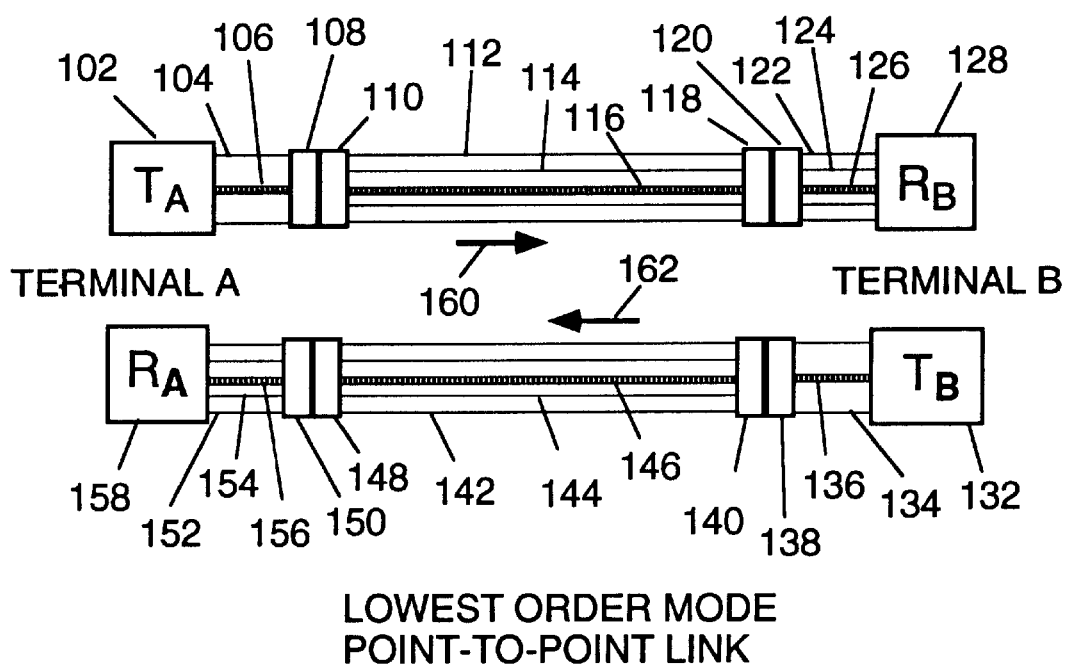
FIG. 2 shows a schematic diagram of a point-to-point communication link where light is transmitted in the fundamental mode or lowest order modes of multimode graded-index fibers in each direction. After the fibers are coaxially aligned and in contact, light in a singlemode fiber is launched into the fundamental mode of a multimode graded-index fiber. A transmitter and a receiver are located at each terminal of the link. Multimode graded-index fiber is the principal transmission medium of the link.
Figure 3:
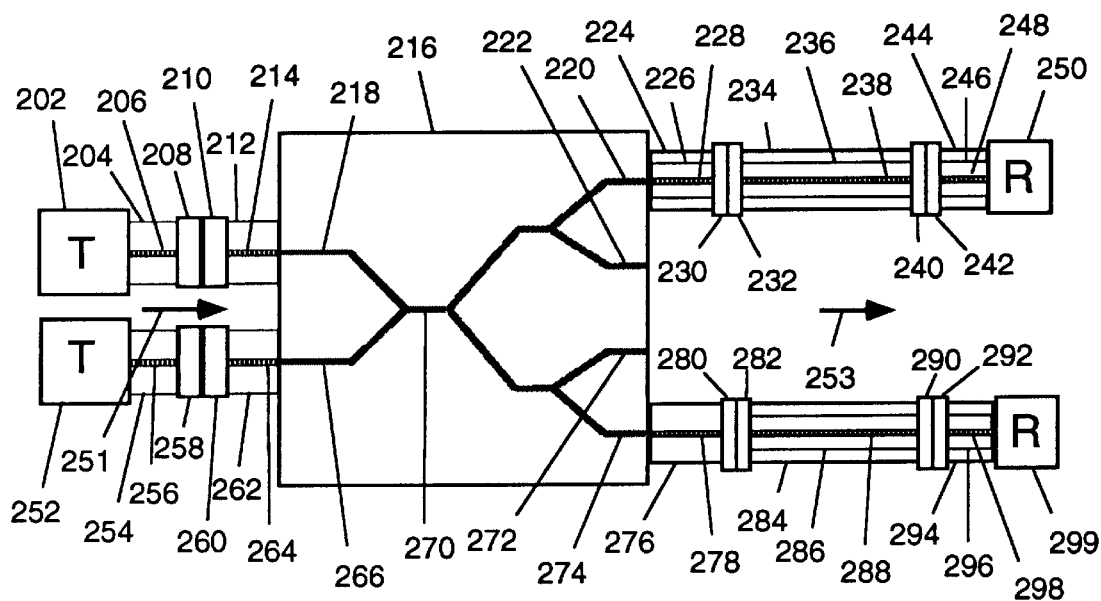
FIG. 3 is a schematic diagram illustrating an optical fiber network for combining modulated light waves from two sources and distributing the combined modulated light waves into four channels, using a two input by four output singlemode coupler. Modulated light waves are then launched into the fundamental mode or into lowest order modes of four multimode graded-index fiber. Multimode graded-index fiber is the principal transmission medium of the network.

FIGS. 2 and 3 illustrate fiber optic communication networks where the data light is transmitted in the fundamental mode or in lowest order modes of multimode graded-index fiber. Light waves in the fundamental mode, or in the lowest order modes, propagate in multimode graded-index fiber along the axis of the multimode fiber and has a propagation mode diameter of about 8 to 10 micrometers. The advantage of fundamental mode transmission, or transmission in a limited set of lowest order modes, is that very high data rates. Other advantages, cited above, is low transmission loss, low modal noise, and high data security.

Previously installed multimode graded-index fiber networks can be upgraded for high data rate transmission by using fundamental mode, or lowest order mode, transmission without having to install new singlemode fibers.

In FIG. 2, a point-to-point communication link is shown, where modulated light is transmitted in the fundamental mode, or in a set of lowest order modes, of multimode graded-index fibers. Transmitter 102 and receiver 158 are located at one terminal of the point-to-point link and transmitter 132 and receiver 128 are located at the other terminal. Modulated light is transmitted from terminal A to terminal B in the fundamental mode, or lowest order modes, 116 of multimode graded-index fiber 112. Similarly, modulated light is transmitted from terminal B to terminal A in the fundamental mode, or lowest order modes, 146 of multimode graded index fiber 142.

A laser or light emitting diode source of transmitter 102 launches modulated light into the core 106 of singlemode fiber 104. The light in core 106 is launched directly into the fundamental mode, or lowest order modes, 116 of the transmission multimode graded-index fiber 112. In order to do this, singlemode fiber 104 is aligned coaxially and in contact with multimode fiber 112 by means of precision connector halves 108 and 110. The modulated light is launched into the fundamental mode, or lowest order modes, 126 of multimode graded index fiber 122 and then to the detector of receiver 128 at terminal B. Multimode fibers 112 and multimode fiber 122 are aligned coaxially and in contact using connector halves 118 and 120. Modulated light is detected by an optical detector of receiver 128 of terminal B. The core to cladding interfaces of fibers 112 and 122 are indicated by the dotted lines 114 and 124, respectively. Direction of light propagation is indicated by arrow 160.

Similarly, modulated light from transmitter 132 of terminal B is transmitted to the receiver 158 of terminal A. A laser or light emitting diode source of transmitter 132 launches its modulated light into the core 136 of singlemode fiber 134. The light in core 136 is launched directly into the fundamental mode, or into the set of lowest order modes, 146 of transmission multimode graded index fiber 142. Fibers 134 and 142 are aligned coaxially and in contact using connector halves 138 and 140. The modulated light is launched into multimode graded-index fiber 152. Fibers 142 and 152 are aligned coaxially and in contact using connector halves 148 and 150. Modulated light 156 is detected by the detector of receiver 158 of terminal A. The core to cladding interfaces of multimode fibers 142 and 152 are indicated by dotted lines 144 and 154, respectively. The direction of light propagation is indicated by arrow 162. Thus, FIG. 2 describes a bidirectional, or two way, fiber optic communication link where modulated light is transmitted in the fundamental propagation mode, or in a set of lowest order propagation modes, of multimode graded-index fiber.

FIG. 3 illustrates a fiber optic network where modulated light waves from two transmitters are combined and transmitted to four different receivers via the fundamental mode, or a set of lowest order modes, of four multimode graded-index transmission fibers. Each receiver receives modulated light waves from both transmitters. The combining and distributing of the light waves are performed with a singlemode star coupler having two input channels and four output channels. The figure illustrates a planar waveguide singlemode star coupler. Other types of singlemode star couplers, such as a fused fiber star coupler, may also be used. In general, a star coupler may have one or more input channels and one or more output channels.

In FIG. 3 transmitter 202 contains the electronics for modulating the laser diode source which propagates modulated data light into the core 206 of a singlemode fiber pigtail 204. The data light is then launched into the core 214 of singlemode fiber 212, where fibers 204 and 212 are aligned coaxially and in contact using connector halves 208 and 210. The light in core 214 of fiber 212 is propagated into planar waveguide singlemode channel 218 of the singlemode planar waveguide star coupler 216. The core 214 and the channel 218 are aligned coaxially and in contact. Similarly, the light from the laser diode source in transmitter 252 transmits modulated data light into channel 266 of the planar waveguide star coupler 216 via core 256 of singlemode fiber 254 and core 264 of singlemode fiber 262. Fibers 254 and 262 are aligned coaxially and in contact using connector halves 258 and 260, and singlemode core 264 is aligned coaxially and in contact with singlemode channel 266. Direction of light propagation is indicated by arrow 251.

Modulated light in input channels 218 and 266 are combined into channel 270 and then distributed into channels 220, 222, 272 and 274. Thus, modulated light from transmitter 202 and from transmitter 252 both propagate in channels 220, 222, 272 and 274.

With the planar waveguide star coupler 216 of FIG. 3 there are two ways to launch light into the fundamental modes, or lowest order modes, of the transmission multimode graded index fibers 234 and 284 at the output of the planar waveguide singlemode coupler, as illustrated: (a) the light in channel 274 is first launched into the core 278 of singlemode fiber 276 and then into the fundamental mode, or lowest order modes, 288 of the transmission multimode graded index fiber 284. The planar waveguide channel 274 is aligned coaxially and in contact with the core 278 of fiber 276. The singlemode fiber 276 and multimode fiber 284 are aligned coaxially and in contact using connector halves 280 and 282. (b) The light in planar waveguide channel 220 is first launched into the fundamental mode, or into the lowest order modes 228 of multimode graded index fiber 224. Light in the fundamental mode, or lowest order modes, 228 of fiber 224 is then launched into the fundamental mode, or lowest order modes, 238 of the transmission multimode graded index fiber 234. Channel 220 is aligned coaxially and in contact with multimode graded index fiber 224. The transmission multimode graded index fiber 234 is aligned coaxially and in contact with multimode graded index fiber 224 using connector halves 230 and 232. Methods (a) and (b) are two alternate ways to launch light into the fundamental modes, or into the lowest order modes, of the transmission multimode graded index fibers and depend upon the fibers connected to the planar waveguide coupler. Direction of light propagation is indicated by arrow 253.

To complete the description of FIG. 3, the modulated light waves in the fundamental mode, or in the lowest order modes, 288 of fiber 284 are launched into the fundamental mode, or the lowest order modes, 298 of multimode fiber graded index fiber pigtail 294 and then transmitted to the detector of receiver 299. Fibers 284 and 294 are aligned coaxially and in contact using connector halves 290 and 292. The dotted lines 286 and 296 are the core to cladding interfaces of fibers 284 and 294, respectively. Similarly, the light in fiber 234 is launched into the fundamental mode, or in the lowest order modes, 248 of fiber 244 and then transmitted to the detector of receiver 250. Fibers 234 and 244 are aligned coaxially and in contact with connector halves 240 and 242. The dotted lines 226, 236 and 246 are the core to cladding interfaces of fibers 224, 234 and 244, respectively.

When the light source of transmitter 202 and the light source of transmitter 252 emit at different wavelengths, the light from both sources are combined by the coupler and transmitted to each of the receivers 250 and 299. The light at the two wavelengths may be separately detected at each receiver, using a wavelength demultiplexer, as described in many fiber optic books, such as that by J. M. Senior, Optical Fiber Communications, published by Prentice Hall, NY, 1992.

When a singlemode fused coupler is used as a combining and distributing device, the fused coupler will have singlemode fiber pigtails. Therefore, the launching of data light into the fundamental mode will be accomplished by direct alignment of the singlemode fibers pigtails of the fused coupler to the multimode graded index fibers.

The optical fiber connectors described in this specification may be singlemode fiber connectors which are commercially available. Such connectors hold the coaxial alignment within a lateral displacement tolerance of about one or two micrometers, which is satisfactory for the networks described in this application. Another type of connector, using a lens between two separated ends of the fiber pair, where the core at the end of the singlemode fiber is imaged on the axis at the end of the multimode graded index fiber, can be used. Optical fiber splices, fused and mechanical, may also be used to connect two lengths of fibers, although improperly fused splices may mix modes.

In order to reduce laser diode source noise arising from back reflections from the connector fiber interfaces, a common commercial practice is to grind and polish the mating optical fiber faces at an angle of approximately eight degrees from axis normal, so that the reflected light does not reach the laser diode source. Another commercial practice is to introduce refractive index matching fluid at the optical fiber interfaces in order to reduce back reflection. A third commercial practice to minimize spontaneous laser noise due to back reflection is to use a Faraday isolator after the diode laser and in line with the fibers. The above-described components may be used in the network illustrated in this specification.

It will be appreciated that, although specific embodiments of the invention have been described in detail for purposes of illustration, various modifications may be made without departing from the spirit and scope of the invention. Accordingly, the invention is not to be limited except as by the appended claims.

We claim:

1. A fiber optic communication system, comprising:
   a multimode graded-index fiber, contained within a transmission cable of said system;
   light source, launching modulated light into a singlemode waveguide;
   first small set of lowest order propagation modes of said multimode graded-index fiber;
   said modulated light, propagating in said singlemode waveguide, launched into said first small set of lowest order propagation modes of said multimode graded-index fiber, by aligning said singlemode waveguide coaxially and in contact with the core of said multimode graded-index fiber;
   a second limited small set of lowest order propagation modes, arising from fiber bending perturbations of the lowest order fundamental mode of said multimode graded-index fiber in said transmission cable;
   said second limited small set of lowest order propagation modes, containing, at least, all propagation modes of said first small set of lowest order propagation modes launched into said multimode graded-index fiber;
   wherein said modulated light launched into said first set of modes may convert into modes of said second limited small set of lowest order propagation modes arising from fiber bending perturbations within said transmission cable;
   optical detector;
   said modulated light, propagating to the end of fiber, is detected by said optical detector;
   whereby said modulated light, transmitted by said multimode graded-index fiber in said transmission cable, propagates with low transmission loss, low modal noise, high data security, and high data rate capability, despite fiber bending perturbations in said transmission cable, wherein said high data rate is due to small modal time dispersion of the small number of modes in said second limited small set of lowest order propagation modes of said multimode graded-index fiber.

2. Said fiber optic communication system of claim 1:
   wherein said first small set of the lowest order propagation modes launched into said multimode fiber consists of only said lowest order fundamental propagation mode of said multimode graded-index fiber wherein mode profile of said singlemode waveguide is designed to closely match mode profile of said fundamental propagation mode.

3. Said fiber optic communication system of claim 2:
   wherein said second limited small set of lowest order modes consists of only said lowest order fundamental propagation mode of said multimode graded-index fiber.

4. Said fiber optic communication system of claim 1:
   wherein said singlemode waveguide is a singlemode fiber.

5. Said fiber optic communication system of claim 1:
   wherein said singlemode waveguide is a waveguide channel of a planar optical waveguide circuit.

6. Said fiber optic communication system of claim 4:
   wherein said alignment of said singlemode fiber to said multimode graded-index fiber is accomplished with a fiber optic connector.

7. Said fiber optic communication system of claim 4:
   wherein said alignment of said singlemode fiber to said multimode graded-index fiber is accomplished with a fiber optic splice.

8. Said fiber optic communication system of claim 1:
   wherein said light source is a laser diode.

9. Said fiber optic communication system of claim 1:
   wherein said light source is a light emitting diode.

10. A fiber optic communication system comprising:
    M light sources, each launching modulated light into a singlemode fiber pigtail, where M is a positive integer;
    N multimode graded index fibers contained in transmission cables of said system, where N is a positive integer;
    M×N singlemode optical coupler, having M input singlemode fibers and N output singlemode fibers;
    each of said singlemode fiber pigtails of said M light sources connected to one of said M input singlemode fibers of said M×N coupler;
    light from each of said M light sources combined and distributed by said coupler to each of said N output singlemode fibers of said M×N coupler;
    each of said N multimode graded-index fiber aligned coaxially and in contact with one of said N output singlemode fiber of said M×N singlemode coupler;
    wherein said modulated light from said M light sources are distributed and launched into first small set of lowest order propagation modes of each of said N multimode graded-index fibers;
    a second limited small set of lowest order propagation modes, containing, at least, all modes of said first small set of lowest order propagation modes;
    wherein said modulated light launched into said first small set of lowest order modes in each of said multimode graded-index fiber may convert into modes of said second limited small set of lowest order propagation modes due to fiber bending perturbations occurring within said transmission cables;
    said modulated light at end of fiber detected by wavelength division demultiplexing means;
    whereby modulated light from said M sources, distributed to said N multimode graded-index fibers in cables, propagate to the ends of said N multimode graded-index fibers with low transmission loss, low modal noise, high data security, and high data rate capability, despite fiber bending perturbations within said transmission cables, where said high data rate is due to small modal time dispersion of the small number of modes in said second limited small set of lowest order propagation modes of said multimode graded-index fiber.

11. Said fiber optic communication system of claim 10:
    wherein said first small set of lowest order modes consists of only the lowest order fundamental propagation mode wherein mode profile of said singlemode optical coupler is designed to closely match mode profile of said fundamental progagation mode.

12. A method for transmitting digital data at high data rate in multimode graded-index fiber in a transmission cable, including:

minimizing the number of lowest order propagation modes launched in said multimode graded-index fiber, by launching data light into a singlemode fiber, then coaxially contacting said singlemode fiber to said multimode graded-index fiber, thereby launching first small set of said lowest order propagation modes into said multimode graded-index fiber;

providing for case of mode conversion due to fiber bending perturbations of said multimode graded-index fiber in cables, where modes of said first small set of lowest order modes convert into modes within a second limited small set of lowest order modes arising from said fiber bending perturbations, as shown experimentally and theoretically, by launching said first small set of lowest order propagation modes containing fewer lowest order modes than that contained in said second small set of lowest order modes arising from said fiber bending perturbations;

whereby said modulated light, transmitted by said multimode graded-index fiber in said transmission cable, propagates with low transmission loss, low modal noise, high data security, and high data rate capability, despite fiber bending perturbations in said transmission cable, wherein said high data rate is due to small modal time dispersion of the small number of modes in said second limited small set of lowest order propagation modes of said multimode graded-index fiber.

13. Said method of claim 12:

providing said first small set of lowest order propagation modes to contain only said lowest order fundamental propagation mode.

\* \* \* \* \*